United States Patent [19]

Kelley et al.

[11] 4,452,129

[45] Jun. 5, 1984

[54] SPRING-RODLESS HINGELESS VENTILATOR

[76] Inventors: Timothy A. Kelley, 775 Virginia, Salem, Va. 24153; Pamela K. Mather, 4313 Hillcrest Dr., Madison, Wis. 53705

[21] Appl. No.: 470,081

[22] Filed: Feb. 28, 1983

[51] Int. Cl.³ .............................................. B60H 1/26
[52] U.S. Cl. ........................................ 98/2.18; 16/231; 49/382; 292/23; 292/262; 308/203
[58] Field of Search .................. 16/231; 49/382; 98/2, 98/2.16, 2.18, 41 R; 292/23, 193, 262; 308/203, 204, 238

[56] References Cited

U.S. PATENT DOCUMENTS

| | | | |
|---|---|---|---|
| 1,845,417 | 2/1932 | Ingham | 292/193 X |
| 3,046,865 | 7/1962 | Kelly | 98/2.18 X |
| 3,492,055 | 1/1970 | Frankland | 308/238 X |
| 3,839,950 | 10/1974 | Kelly et al. | 98/2.18 X |

*Primary Examiner*—Albert J. Makay
*Assistant Examiner*—Harold Joyce
*Attorney, Agent, or Firm*—Wilmer Mechlin

[57] ABSTRACT

A hingeless ventilator having a frame attachable to a wall of a compartment about an opening therein, a closure member swingable against a side of the frame for opening and closing the opening, guide members fixed to and instanding from an opposite side of the frame beyond opposite ends of the wall opening, and arms fixed to the closure member adjacent opposite ends thereof and instanding therefrom through the wall opening and a screen plate integral with the frame and screening the opening, in which the arms mount on oppositely projecting stub axles a pair of rollers each riding on a guide surface of the adjoining guide member and having for engaging that surface an elastomeric collar, and compression of the collars of the pair of rollers against the guide surfaces provides through the arms of the closure member the tensile force for holding the closure member against and in any selected position relative to the frame when swung to that position by a handle connecting and reinforcing the end portions of the arms.

9 Claims, 4 Drawing Figures

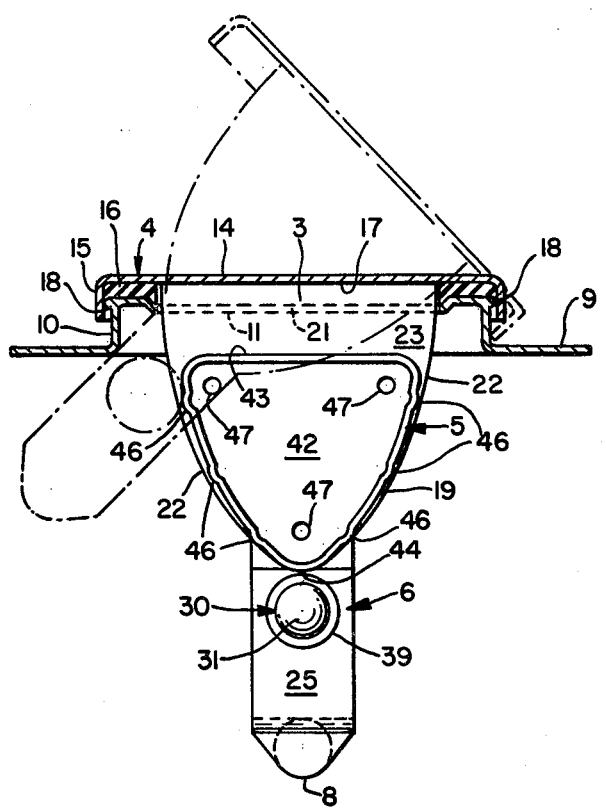
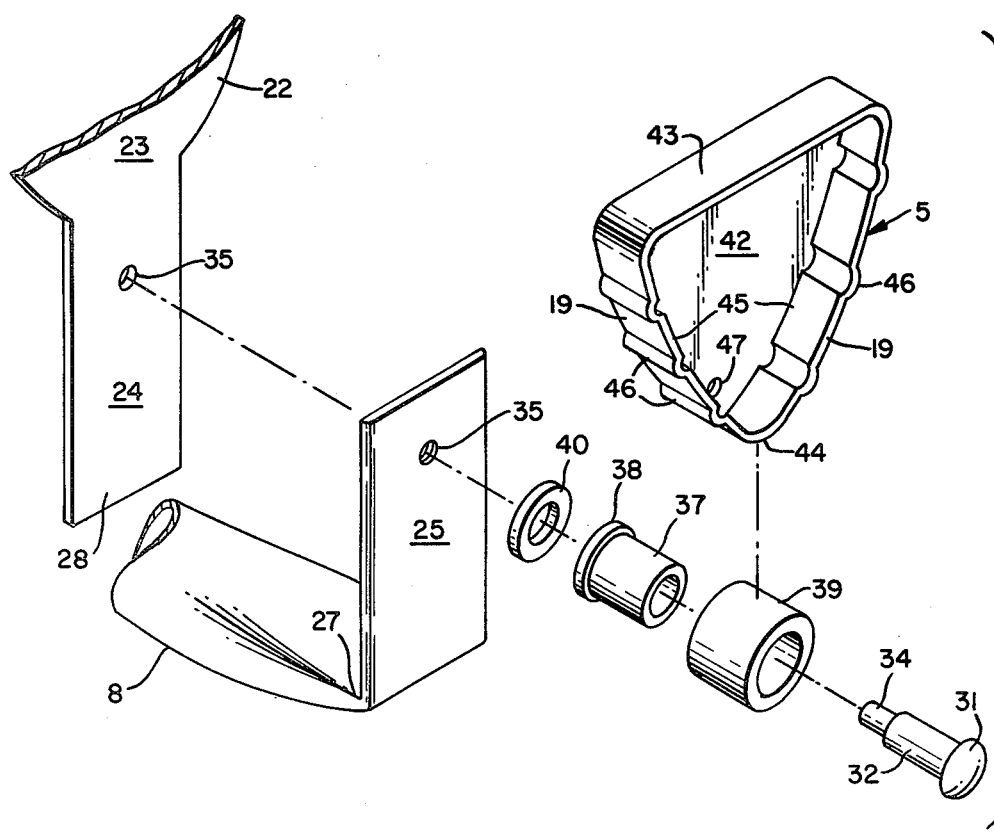
FIG. 3.
FIG. 4.

SPRING-RODLESS HINGELESS VENTILATOR

Background of the Invention

Heretofore, there have been a number of Kelly and Kelly et al patents on hingeless ventilators for ventilating a cab or other compartment of a land vehicle. Most such patents are of the two-way type adapted in a moving vehicle alternately to direct air into and exhaust air from the compartment. Representative of such patents are Kelly et el U.S. Pat. Nos. 3,102,464, 3,358,576 and 3,839,950. In each of these patents, the ventilator has a frame attachable to a wall of a cab or other compartment about an opening therein and corresponding opening in the frame bounded by an outturned flange. A closure member on one side of the frame fitting in closed position over the frame opening, has an inturned marginal flange surrounding and overlapping the frame flange and engageable with the latter at either side of the frame opening for substantially fixing the axis about which the closure member swings in either direction. The closure member is held against the frame and in any selected position by a spring rod connected for swinging in unison to the closure member and riding at opposite ends on fixed guides on the other side of and instanding from the frame. When, as in these patents, the spring rod is the source of the tensile force for holding the closure member against the frame, a middle arm or other means connected to the closure member, is necessary to flex the spring rod intermediate its ends toward the closure member. It to an improvement on these prior Kelly et al patents and especially the latest, U.S. Pat. No. 3,839,950, that the present invention is particularly directed.

Summary of the Invention

The primary object of the present invention is to provide an improved hingeless ventilator having a frame and a closure member swingable relative thereto, wherein the tensile force for holding the closure member in selected position relative to the frame is derived from the compression of elastomeric rollers mounted on arms fixed to the closure member and riding on guide members fixed to the frame.

Another object of the invention is to provide an improved two-way hingeless ventilator having a frame bounding on opening therein and a closure member swingable against a side of the frame at opposite sides of the opening, guide members fixed to and instanding from the other side of the frame being opposite ends of the opening, and a pair of arms fixed to the closure member adjacent opposite ends thereof and instanding therefrom through the opening, wherein the arms mount on oppositely projecting stub axles thereto rollers each riding on a guide surface of an adjacent guide member and having an elastomeric collar engaging and compressed against that surface for together exerting through the arms a tensile force for holding the closure member against and in selected position relative to the frame, and the arms are connected and reinforced over the areas mounting the rollers by a handle for swinging the closure member relative to the frame.

A further object of the invention is to provide an improved two-way hingeless ventilator that is relatively simple in construction and rugged and durable in operation and is adpated to be fabricated for the most part from relatively thin metal for minimizing cost.

Other objects and advantages of the invention will appear hereinafter in the detailed description, be particularly pointed out in the appended claims and be illustrated in the accompanying drawings in which:

Figure Description

FIG. 3 is an end elevational view partly in section, taken along lines 3—3 of FIG. 2; and FIG. 4 is an enlarged partly fragmentary exploded view of a preferred roller assembly and its relation to the guide member on which it rides and the parts of the arm and handle for the closure member on which the roller assembly is mounted.

Detailed Description

Figure 1:
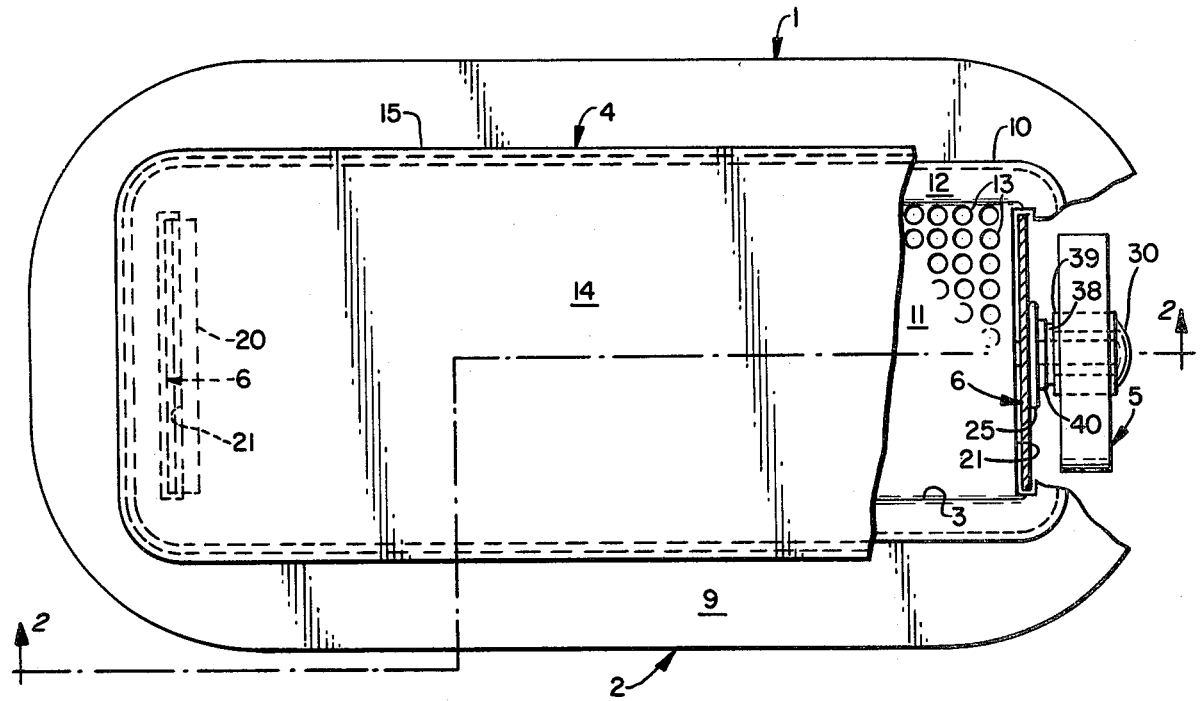
FIG. 1 is an outer plan view of a preferred embodiment of the spring-rodless hingeless ventilator of the present invention, with portions broken away and shown in section to more clearly illustrate certain of the details of construction.
Figure 2:
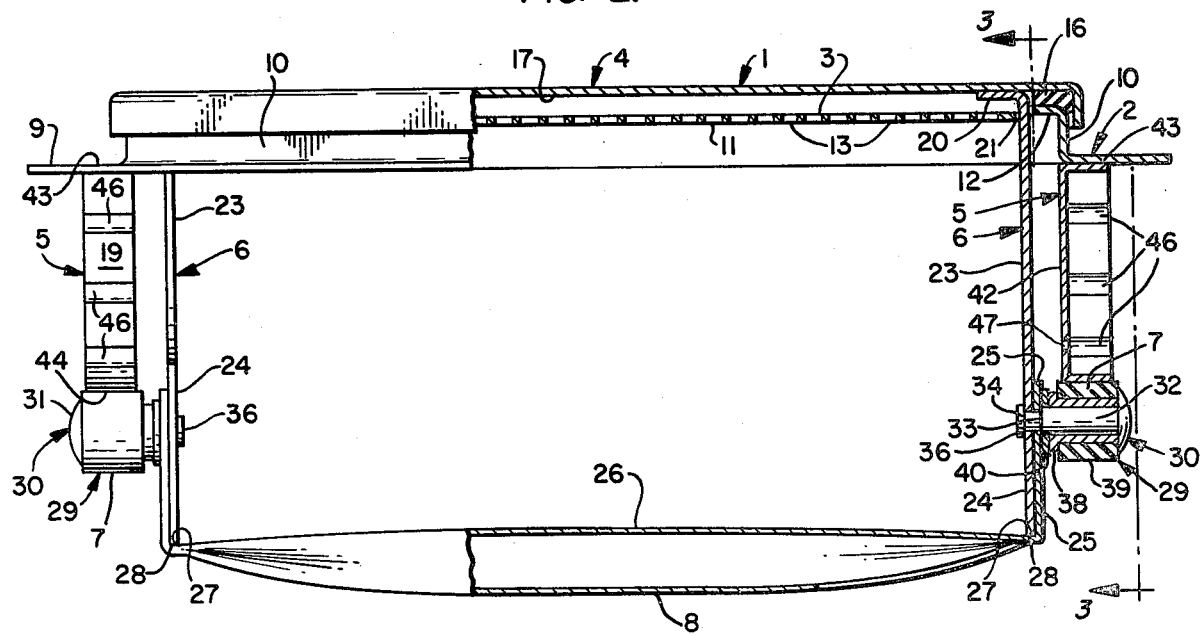
FIG. 2 is a verticle sectional view taken along lines 2—2 of FIG. 1.

Referring now in detail to the drawings in which like reference characters designate like parts, the preferred spring-rodless hingeless ventilator of the present invention, while adapted to control the flow of air into and from an enclosure or compartment, is particularly designed for ventilating a truck or tractor cab or other compartment of a vehicle by enabling air to be forced into or exhausted from the cab through an opening in one wall thereof while the vehicle is moving, as well as to close the opening in inclement weather, and will be so described as exemplary of the invention.

Generally similar to the hingeless ventilator of Kelly et al. U.S. Pat. No. 3,839,950 on which it improves, the spring-rodless hingeless ventilator of the present invention, designated as 1, is comprised of a frame 2 attachable or securable to a suitably apertured exterior wall (not shown) of a vehicle cab, compartment or enclosure (not shown) and having a generally rectangular central opening 3 open to the cab's interior, a closure member, cover of door 4 seatable against an outer side of and swingable on the frame for opening and closing the central opening, spaced guides or guide members 5 fixed to or instanding from the inner side of the frame beyond opposite ends of the opening, spaced arms or end brackets 6 fixed adjacent opposite ends of and instanding from the closure member through the opening, elastomeric rollers 7 mounted on the arms and riding on the guide members for holding the closure member assembled and in any selected position relative to the frame, and a handle or bail 8 connected to and reinforcing the parts of the arms mounting the rollers for swinging the closure member to selected position.

As in Kelly et al. U.S. Pat. No. 3,839,950, the frame 2 has a mounting or base flange 9 attached, fixed or secured, when installed, to the inside of the cab wall (not shown) about the aperture therein (not shown) and terminating or bounded inwardly by an outturned or outstanding lip of flange 10 outstanding from and substantially normal to and unitary or integral with the base flange and laterally surrounding or bounding the frame's central opening 3. Again, as in the above Kelly et al. patent, the preferred frame 2 has in or interrupting the central opening 3 a foraminous or perforated screen member or plate 11, preferably inset laterally from and below the upper edge or end of the lip 10 and peripherally or marginally connected thereto by an interposed or intervening web 12. A unitary or integral part of the frame 2, conveniently stamped with the balance of the frame from the same sheet of stainless steel, aluminum or other suitable metal, the screen plate 11 has the perforations or holes 13 suitably punched therein, of such size and so distributed as to freely pass air in either direction, while substantially obstructing or blocking passage of bugs or other foreign solid matter into the interior of the cab.

The preferred closure member 4 is of the same generally rectangular shape as the opening 3 in the frame and has a suitably flat body or main part 14 of a size to fit over and close the frame opening in the closure member's closed position. In the same closed position, an inturned marginal flange or skirt 15, extending around the periphery of and instanding from and substantially normal to the body 14, surrounds and overlaps the lip 10 on the frame 2 and is then or normally spaced from both the lip and the base flange 9 so as not to interfere with closing of the opening 3. When closed, the closure member 4 preferrably seals the opening 3 weather- or airtight, suitably by a sealing gasket 16 in the form of a generally rectangular band or sheet of rubber or like resilient material carried by and fixed as by bonding to and covering at least the peripheral portion of the closure member's inner face 17. Whether a band or sheet, the sealing gasket 16 extends from the skirt 15 inwardly beyond and overlaps the frame's lip 10 in the closed position of the closure member 4.

To benefit from its two-way action in ventilating a vehicle cab or compartment, the ventilator 1 is so installed or positioned on an exterior wall of the cab that the closure member 4 will open longitudinally or towards the front and rear of the vehicle. Thus, depending on the direction in which the closure member is opened, the ventilator, while the vehicle is moving, will direct air either into or from the compartment, the former by the pressure and the latter by the suction exerted by the movement of the vehicle relative to ambient air.

As in prior Kelly and Kelly et al patents on hingeless ventilators such as Kelly et al. U.S. Pat. Nos. 3,102,464, 3,558,576 and 3,839,950, the axis upon which the closure member 4 swings against and relative to the frame 2 at either side of the openings 3, is substantilly fixed by the interfit or interengagement of parts of the closure member and frame, suitably the side portions of the skirt 15 of the closure member and lip 10 of the frame at corresponding sides of the opening. Over most of the range of swinging of the closure member relative to the frame at either side of the opening 3, the side portion of the skirt 15 at the opposite side of the opening, under the tensile or pulling force exerted on the closure member by the compression of the elastomeric rollers 7 against the guide members 5, engages and acts against the corresponding or confronting side portion of the lip and seats or is received in or adjacent the bend at that side between the lip and the mounting flange 9 for substantially fixing the axis about which the closure member swings.

In its closed or normal position, the closure member 4 is centered on the frame opening 3 with its skirt 15 spaced outwardly from the lip 10 on the frame 2 so that the lip will not interfere with the initial opening and final closing of the closure member when the skirt and lip are disengaged. To maintain this normal spacing on both the closed position of the closure member 4 and over the slight transition arc in its swing while the skirt 15 and lip 10 are disengaged, the lip conveniently has on either side adjacent its corners, a pair of bosses, knobs or bumps 18, fixed to or rigid with and laterally outstanding from that side. Suitably positioned on the sides of the lip 10 to engage the confronting sides of the skirt 15 below the sealing gasket 16, the bosses 18 and interengagement of the skirt and lip beyond the transition arc, effectively restrain the closure member 4 against lateral shifting or displacement relative to the frame over the closure member's range of relative movement.

With the interengagement of the skirt 15 on the closure member 4 and lip 10 on the frame 2 about the opening 3 substantially fixing the swinging axis of the closure member at either side of the opening and guide surfaces 19 on opposite sides of each of the guide members 5 on which the rollers ride, arcuately and preferably cylindrically convex and each substantially coaxial or concentric with the swinging axis of the closure member 4 at the opposite side of the opening 3, the tensile or pulling force exerted on the closure member by compression of the elastomeric rollers, enables that force to be substantially the same or uniform over the range of opening and closing movements of the closure member.

Similar to those of Kelly et al. U.S. Pat. No. 3,839,950, the arms or end brackets 6 fixed to and instanding from the closure member 4, except for intruned feet or base flanges 20 fixed, as by welding, to the inner face 17 of the closure member 4, preferably are flat and generally pear- or pyriform-shaped. Instanding normal or perpendicular to the closure member's inner face 17 and disposed or extending transversely of that member substantially to the sealing gasket 16, the arms 6 extend through transverse slots 21 in the screen plate 11 beyond opposite ends of its array of perforations 13 and have their marginal edges 22 at oppisit sides of their inwardly tapering bodies or main parts 23 each struck about or concentric with an opposite swinging axis of the closure member so that the arms substantially fill the slots in any position of the closure member. The resultant close fit of the arms 6 in the slots 21 not only blocks passage of bugs or other foreign matter through the slots but also, by severely limiting any relative twisting of the arms relative to the frame, effectively inhibits accidental dislodgement of the closure member from operative positions on the frame.

The inner ends or distal portions 24 of the arms 6 beyond their bodies 23 suitably are rectangular and embraced, straddled or overlapped by upturned or upstanding end flanges 25 of the handle 8. Conveniently tubular intermediate its ends for ready grasping by an operator, the web or handle portion 26 of the handle 8 is disposed generally parallel to the inner face 17 of the closure member 4 and is split and flattened toward opposite ends at which it is bent upwardly to form the desirably flat end flanges 25 and provide in the bends therebetween flat upwardly facing seats 27 for receiving, seating or engaging against relative angling the correspondingly flat or squared distal or inner ends 28 of the arms 6. If, as both possible and preferred, most of the components of the improved ventilator are stamped, drawn or otherwise formed or fabricated from relatively thin sheet metal of uniform thickness or gauge, the end flanges 25 of the handle 8, by extending upwardly along the inner end portions 24 of the arms 6 beyond the points at which the rollers 7 are mounted thereon, reinforce the arms over that area by doubling the thickness of the metal mounting the rollers.

The elastomeric rollers 7, offset outwardly or longitudinally of the closure member 4 from the latter's arms or end brackets 6 and responsible by their compression against the guide surface or guideways 19 on the guide members 5 for the tensile force exerted on the closure member, are each part of a roller assembly 29, having a stub axle 30 mounted on and fixed, secured or attached to the distal portion 24 of the adjacent arm and preferably also connecting the arm to the overlapping, upturned end flange 25 at the corresponding end of the handle 8. Suitably the illustrated rivet or a bolt, each stub axle 30 has an outer head 31 on its outer end, a cylindrical shank 32 of uniform diameter extending inwardly from the outer head to an annular shoulder or abutment 33, and a concentric relatively reduced or smaller diameter inner end or tip portion 34 projecting or extending inwardly from the shoulder demarking the inner end of the shank and insertable in and of a length to extend through aligned apertures 35 of like diameter in the arm 6 and end flange 25 of the handle 8.

When, in mounting the roller assemblies 29 on the arms' distal portions 24 and handle end flanges 25, the reduced end portion 30 of the stub axles 30 are inserted through the aperture 35 and the inner ends of the axles, inwardly beyond the arms 6, are upset or peened over or threaded into nuts to form the axles' inner heads 36 and fix, rivet or bolt the roller assemblies to the arms, each arm distal portion and adjoining handle end flange will be clamped between the inner head and the shoulder 33 of one of the stub axles. With the inner ends 28 of the arms 6 then engaging or seating or abutting against the seats 27 on the handle 8, the arms and handle will be locked against relative movement and rigidly connected to the closure member 4 for swinging or moving in unison therewith.

Each preferred roller assembly 28 has an inwardly peripherally flanged cylindrical bearing or bushing 37 concentric or coaxial with and shorter than the axle's shank 32 and in assembly slidable onto and thereafter journaled or rotatable or turnable on the shank. Forming the hub of the roller 7, the bearing 37 in assembled position, abuts the outer head 31 and peripherally carries or mounts between its radially outstanding peripheral flange 38 and the outer head, a tight- or close-fitting, annular and preferably cylindrical resilient collar or tire 39 made of elastomeric or resilient, wear-resistant material, such as polyurethane. The collars of the roller assemblies 29 are of a resilience and thickness such that, when both are compressed against the guide surfaces 19 of the guide memebers 5 to the extent predetermined by their outside diameters and the radial spacing of their axes from the guide surfaces, they will transmit through their axles 30 and the arms 6 to the closure member 4 a tensile or pulling force sufficient to hold the closure member against and in any selective position relative to the frame 2. Each of the preferred roller assemblies 29 also includes a retaining washer 40 on the shank 32 of the rivet 30 inwardly of the bearing 37 and interposed on installation of the assembly between the bearing and the adjoining end flange 25 of the handle 8 for spacing the bearing from the end flange and relieving that flange of any wear otherwise attendant direct contact with the bearing.

Consistent with an objective of the present invention of providing a two-way hingeless ventilator of ample strength and durability, fabricated for the most part from sheet metal of uniform thickness with consequent minimizing of cost, the guide members 5 preferably are drawn from such material. As drawn, each guide member 5 is an open-fronted, closed-backed member bounded peripherally by a generally triangular continuous flange 41 outstanding normal to its closed back 42 and having rounded corners and, as one side, a flat base 43 fixable or securable, as by welding, to the underside or innerside of the base flange 9 of the frame 2. Merging downwardly or away from the frame 2 in an apex 44, the other sides 45 of the peripheral flange are arcuately and preferably cylindrically convex, each struck about and substantially concentric with the swinging axis of the closure member 4 on the opposite side of the frame opening 3 and having as their outer surfaces the guide surfaces or guideways 19 on which one of the elastomeric rollers 7 rides or rolls in the opening and closing movements of the closure member, while the relatively short radius apex 44 seats the roller, preferably under somewhat greater compression when the closure member is in closed position. Circumferentially spaced transverse ribs 46 conveniently interrupt the guideways 19 for limiting or restraining movement of the rollers 7 therealong in selected partly or fully open positions of the closure member 4. Non-functional in the operation of the improved ventilator, the illustrated holes 47 in the corners of the otherwise closed backs 42 of the guide members 5 serve as convenient drain holes for excess paint if the guide members are painted.

From the above detailed description, it will be apparent that there has been provided an improved hingeless ventilator having a closure member swingable against a frame at opposite sides of a screened central opening in the frame and held against and in any selected position relative to the frame by a tensile or pulling force derived from the compression of elastomeric rollers mounted on stub axles for swinging in unison with the closure member and riding on and compressed against guideways of guide members fixed to and instanding from the frame beyond opposite ends of the central opening. It should be understood that the described and disclosed embodiment is merely exemplary of the invention and that all modifications are intended to be included that do not depart from the spirit of the invention and the scope of the appended claims.

Having now described our invention, we claim:

1. A hingeless ventilator for ventilating a compartment through an aperture in a wall thereof, comprising a frame attachable to said wall about said aperture and having a central opening for passing air through said aperture, a closure member swingable against a side of said frame for opening and closing said opening, guide means fixed to and instanding from an opposite side of said frame beyond said opening, arms means fixed to said closure member adjacent opposite ends thereof and instanding therefrom through said opening, and means for applying to said closure member through said arm means a tensile force holding said member against and in selected positions relative to said frame, said force applying means consisting of elastomeric roller means mounted on said arm means and therethrough connected to and swingable with said closure member and riding on and compressed against said guide means.

2. A hingeless ventilator according to claim 1, wherein the arm means are a pair of spaced arms fixed to the closure member adjacent opposite ends thereof, and the elastomeric roller means are a pair of elastomeric rollers each stub axle-mounted on and off-set outwardly from one of said arms.

3. A hingeless ventilator according to claim 2, including a handle connected to and connecting the arms for swinging therewith in unison with the closure member relative to the frame.

4. A hingeless ventilator according to claim 3, wherein a stub axle for each of the elastomeric rollers extends through and is mounted on and projects outwardly from the adjoining arm and has outwardly thereof a shank rotatably mounting the roller.

5. A hingeless ventilator according to claim 4, wherein the handle has at opposite ends thereof upstanding end flanges overlapping and extending upwardly along said arms, the stub axles when mounted on the arms clamp each arm to the adjoining end flange, and seats on a confronting surface of the handle inside the end flanges and engaging distal ends of the arms cooperate with the stub axles for locking the handle and arms against relative movement.

6. A hingeless ventilator according to claim 5, wherein the rollers each includes a bushing rotatably mounted on the shank of the stub axle, and an elastomeric collar peripherally mounted on and rotatable with the bushing, said collars riding on and being compressed against adjoining guide means for applying to the closure member a tensile force holding the member against and in selected positions relative to the frame.

7. A hingless ventilator according to claim 6, wherein the stub axles are rivets having reduced inner end portions concentric with and projecting inwardly from the shanks thereof, and each of said end portions is insertable through aligned apertures in an adjoining arm and handle end flange and operable when upset in forming an inner head on the rivet to clamp the arm and end flange between the inner head and an inner end of the shank of the rivet.

8. A hingeless ventilator according to claim 7, including a lip on and outstanding from the frame and a marginal flange on and instanding from the closure member and overlapping and surrounding said frame lip in the closed position of the closure member, said marginal flange and lip interengaging on swinging of the closure member beyond closed position for substantially fixing the swinging axes of the closure member at opposit sides of the frame opening, the guide means each having on arcuately convex opposite sides thereof cylindrically convex guideways merging at an apex of the guide means and each struck about an opposite swinging axis of the closure member, and the elastomeric collars of the rollers ride on and are compressed against said guideways on the guide means over the range of movement of the closure member relative to the frame.

9. A hingeless ventilator according to claim 8, including rib means on and spaced along and extending transversely of the guideways of the guide means for limiting movement of the rollers in any selected position of the closure member.

* * * * *

UNITED STATES PATENT AND TRADEMARK OFFICE
CERTIFICATE OF CORRECTION

PATENT NO. : 4,452,129
DATED : June 5, 1984
INVENTOR(S) : Timothy A. Kelly and Pamela K. Mather It is certified that error appears in the above-identified patent and that said Letters Patent is hereby corrected as shown below:

[76]  Surname of first-named inventor is KELLY

RELATED U.S. APPLICATION DATA

[63]  Continuation of Ser. No. 295,778, Aug. 24, 1981, abandoned.

Signed and Sealed this

Twenty-third Day of October 1984

[SEAL]

Attest:

GERALD J. MOSSINGHOFF

Attesting Officer

Commissioner of Patents and Trademarks